United States Patent [19] [11] 4,103,047
Zaki et al. [45] * Jul. 25, 1978

[54] FABRIC TREATMENT COMPOSITIONS

[75] Inventors: Wahib Nassif Zaki, Brussels, Belgium; Alan Pearce Murphy, Colerain Township, Hamilton County, Ohio

[73] Assignee: The Procter & Gamble Company, Cincinnati, Ohio

[ * ] Notice: The portion of the term of this patent subsequent to May 10, 1994, has been disclaimed.

[21] Appl. No.: 720,176

[22] Filed: Sep. 3, 1976

Related U.S. Application Data

[60] Division of Ser. No. 543,606, Jan. 23, 1975, abandoned, which is a continuation-in-part of Ser. No. 461,311, Apr. 16, 1974, abandoned.

[51] Int. Cl.[2] .......................... B05D 3/12; B32B 3/10

[52] U.S. Cl. .................................. 427/242; 428/136; 428/262; 428/264; 428/289; 428/906; 428/913; 252/8.6; 252/8.75; 252/8.8; 252/8.9

[58] Field of Search ................ 427/242; 252/8.75, 8.8, 252/8.9, 8.6; 428/136, 906, 137, 913, 262, 264, 289; 15/159

[56] References Cited

U.S. PATENT DOCUMENTS

| | | | |
|---|---|---|---|
| 2,461,063 | 2/1949 | Eisen | 427/175 |
| 2,665,463 | 1/1954 | Simon et al. | 15/159 |
| 2,735,790 | 2/1956 | Waitkus | 428/394 |
| 3,632,396 | 1/1972 | Perez-Zamoka | 252/8.6 |
| 3,686,025 | 8/1972 | Morton | 252/8.6 |
| 3,686,120 | 8/1972 | Creely | 252/8.8 |
| 3,698,095 | 10/1972 | Grand et al. | 34/9 |
| 3,793,196 | 2/1974 | Okazaki et al. | 252/8.6 |
| 3,944,694 | 3/1976 | McQueary | 428/906 |
| 4,022,938 | 5/1977 | Zaki et al. | 427/242 |
| 4,049,858 | 9/1977 | Murphy | 252/8.9 |

FOREIGN PATENT DOCUMENTS

| | | | |
|---|---|---|---|
| 1,313,697 | 4/1973 | United Kingdom | 252/8.8 |

*Primary Examiner*—William R. Dixon, Jr.
*Attorney, Agent, or Firm*—Ronald L. Hemingway; Richard C. Witte; Thomas H. O'Flaherty

[57] ABSTRACT

A non-staining, anti-static fabric softening composition comprising particular "sorbitan esters" is applied to fabrics in an automatic laundry dryer.

26 Claims, No Drawings

FABRIC TREATMENT COMPOSITIONS

CROSS-REFERENCE TO RELATED APPLICATIONS

This application is a division of the U.S. Patent application of Alan P. Murphy, Paul Seiden, Francis L. Diehl and Charles B. McCarty, Ser. No. 543,606, filed Jan. 23, 1975, now abandoned which is a continuation-in-part of the U.S. Patent application of Alan P. Murphy, Paul Seiden, Francis L. Diehl and Charles B. McCarty, Ser. No. 461,311, filed Apr. 16, 1974, now abandoned.

BACKGROUND OF THE INVENTION

The present invention encompasses articles and methods for providing softening and anti-static benefits to fabrics in an automatic laundry dryer. More specifically, damp fabrics are commingled with particular "sorbitan esters" in an automatic clothes dryer and are provided with a soft, anti-static finish concurrently with the drying operation. The softening and anti-static sorbitan esters herein are preferably employed in combination with a dispensing means adapted for use in an automatic dryer.

Treatment in an automatic clothes dryer has been shown to be an effective means for imparting desirable tactile properties to fabrics. For example, it is becoming common to soften fabrics in an automatic clothes dryer rather than during the rinse cycle of a laundering operation. (See Gaiser; U.S. Pat. No. 3,442,692; issued May 6, 1969)

Fabric "softness" is an expression well-defined in the art and is usually understood to be that quality of the treated fabric whereby its handle or texture is smooth, pliable and fluffy to the touch. Various chemical compounds have long been known to possess the ability to soften fabrics when applied to them during a laundering operation.

Fabric softness also connotes the absence of static "cling" in the fabrics, and the commonly used cationic fabric softeners provide both softening and anti-static benefits when applied to fabrics. Indeed, with fabrics such as nylon and polyester, the user is more able to perceive and appreciate an anti-static benefit than a true softening benefit.

Fatty alkyl cationic anti-static softening compounds and compositions designed for application to fabrics in an automatic dryer have been the subject of recent innovations. (See, for example, Furgal, U.S. Pat. No. 3,634,947, issued Jan. 18, 1972 and Morton, U.S. Pat. No. 3,686,025, issued Aug. 22, 1972.) Other fatty materials have been suggested for use as dryer-added fabric softeners. (See, for example, Hewitt et al, U.S. Pat. No. 3,676,199, issued July 11, 1972 and the co-pending application of Murphy and Habermehl, Ser. No. 417,329, filed Nov. 19, 1973, now U.S. Pat. No. 4,000,340, issued Dec. 28, 1976). Included among these prior softening compositions are various glycerides in combination with oil-soluble, lower-ethoxylated surfactants. Triglyceride fabric treating agents are disclosed in Bernholz et al, U.S. Pat. No. 3,785,973, issued Jan. 15, 1974.

As pointed out in Hewitt et al, U.S. Pat. No. 3,676,199, issued July 11, 1972 and Wixon, U.S. Pat. No. 3,766,062, issued Oct. 16, 1973, many of the prior art softening agents stain or discolor the conditioned fabrics when used in an automatic dryer. The unfortunate tendency of such materials to stain fabrics is apparently caused by the presence of the fatty alkyl groups in the active softening compounds. Unevenly distributed fatty softeners can appear as blotchy, oily stains on the treated fabrics. Thus, the chemical structure which gives rise to the soft, lubricious feel asociated with the prior art softeners also causes them to be potential fabric stainers.

Heretofore, a variety of mechanical methods have been employed in an attempt to reduce the tendency of dryer-added softeners to stain fabrics. The prior art fabric softening agents have been sorbed onto flexible articles designed to provide controlled release at dryer operating temperatures. While such articles are quite attractive from the standpoint of ease of manufacture and economics, staining can still be a problem if an improperly formulated flexible article becomes entangled in clothing. Various rigid dispensers and appliances have been designed which assertedly avoid any exceptionally high concentrations of softening agent being undesirably deposited on the fabrics in the form of greasy stains (See Hoeflin, U.S. Pat. No. 3,633,538, issued Jan. 11, 1972 and Grand et al, U.S. Pat. No. 3,698,095, issued Oct. 17, 1972). However, such dispensers are costly and have not come into general use.

Certain surfactants have been suggested for obviating the tendency of the prior art softeners to stain fabrics. See the co-pending application of Murphy and Habermehl, Ser. No. 440,932, filed Feb. 8, 1974, now abandoned.) This non-staining aspect is especially important when the common polyester fabrics, which are oleophilic and particularly susceptible to oily staining, are softened in an automatic dryer.

As noted above, many softening compounds have been adapted for use in automatic dryers by fashioning articles which contain a pre-measured amount of the softener. Preferred articles comprise a flexible sheet substrate coated and/or impregnated with an optimal, pre-measured amount of a fabric softener. These articles are simply added to a dryer together with the fabrics to be dried. The heat and tumbling action of the dryer helps to dispense the softener onto the fabric surfaces (See, for example, Perez-Zamora, U.S. Pat. No. 3,632,396, issued Jan. 4, 1972). However, once sorbed onto the sheet substrate, some softeners tend to remain affixed thereto, rather than being dispensed onto the fabrics. Thus, the user of such articles cannot be assured that the optimal amount of softener originally present in the article is, in fact, deposited on the fabrics. To obviate this problem, it has been suggested to layer the softener onto the sheet together with surfactant-type release agents which insure substantially complete transfer to the fabrics (See Perez-Zamora, U.S. Pat. No. 3,632,396, issued Jan. 4, 1972).

Finally, some cationic materials recognized for use as fabric softeners and anti-static agents in dilute, aqueous rinse baths are not particularly useful in certain automatic dryers in that they are reported to soften and loosen certain paints used to protect the dryer drum, and to corrode exposed metal surfaces of some automatic dryer drums.

It has now been found that fatty esters of certain poly-ols, especially the so-called "sorbitan esters", are particularly useful as dryer-added fabric softeners. Such materials contain several free or esterified hydroxyl groups.

Various compounds containing hydroxyl groups are recognized as useful fabric scrooping agents in aqueous media, e.g., those listed in Speel et al, *Textile Chemicals*

*and Auxiliaries,* 2nd Edition, Reinhold Publishing Corp., 1957. Some ethoxylated alcohols are further known to be useful in textile lubricating compositions (See Cohen et al, U.S. Pat. No. 3,773,463, issued Nov. 20, 1973.

The use of various sorbitan ester compounds or derivatives to treat fabrics other than in an automatic clothes dryer is known (See Atlas Powder Company Bulletin #9, "Industrial Emulsions with Atlas Surfactants", 1953; Eisen, U.S. Pat. No. 2,461,043, issued Feb. 8, 1949; Simon et al, U.S. Pat. No. 2,665,443, issued Jan. 12, 1954; Karg, U.S. Pat. No. 3,652,419, issued Mar. 28, 1972 and Crossfield, U.S. Pat. No. 3,827,114, issued Aug. 6, 1974). Softening compositions for use in aqueous media comprising (among other components) a quaternary ammonium compound and a sorbitan ester are disclosed in Okazaki et al, U.S. Pat. No. 3,793,196, issued Feb. 19, 1974 and Waitkus, U.S. Pat. No. 2,735,790, issued Feb. 21, 1956.

The U.S. Patent application of Zaki, Ser. No. 461,312, filed Apr. 16, 1974, now abandoned in favor of a continuation-in-part application having Ser. No. 543,607, filed Jan. 23, 1975, now U.S. Pat. No. 4,022,938, issued May 10, 1977, discloses fabric softening articles comprising a major amount of a cationic softener and a minor amount of a sorbitan ester material as an auxiliary softener and release aid.

The above prior art references relating to sorbitan esters are, for the most part, directed to the aqueous media treatment of yarn during textile processing. Such references do not appear to recognize the particular advantages of these materials as softening agents for use in automatic laundry dryers.

It has now been found that sorbitan esters are especially useful in automatic dryers relative to other prior art fabric softeners. More specifically, the sorbitan esters used herein help alleviate all the aforesaid problems relating to through-the-dryer fabric softening.

First, the sorbitan esters impart a soft, lubricious feel to fabrics when applied to such fabrics in a heated clothes dryer.

Second the sorbitan esters provide an anti-static effect. Accordingly, it is not necessary to use additives with sorbitan esters to achieve the dual benefits of fabric softening and reduced static charge.

Third, the sorbitan esters can be readily dispensed onto fabrics from dryer-added flexible substrate articles by the heat and tumbling action of the dryer without the need for adjuvant release agents.

Fourth, the sorbitan esters provide minimal staining of fabrics when used in the manner disclosed herein.

Finally, the sorbitan esters are safe for use in contact with dryer drum paint and/or metal dryer drum surfaces and, in fact, function as a corrosion inhibitor in the dryer.

It is an object of this invention to provide a safe, effective means for softening fabrics in a clothes dryer.

It is another object herein to provide a superior article of manufacture adapted for imparting softness and anti-static benefits to fabrics in a clothes dryer.

It is another object herein to provide articles of manufacture and methods for softening fabrics in a laundry dryer by employing materials which do not disadvantageously interact with dryer drum metal or paint.

These and other objects are obtained herein as will be seen from the following disclosure.

SUMMARY OF THE INVENTION

The present invention encompasses an article of manufacture adapted for use in an automatic laundry dryer comprising a fabric softening amount of a fatty alkyl sorbitan ester component, as defined hereinafter, especially the $C_{10}$–$C_{26}$ alkyl sorbitan mono- and di-esters, and a dispensing means which provides for release of an effective amount of said esters at automatic dryer operating temperatures, i.e., 50°–100° C.

The invention also encompasses a method for imparting a softening and anti-static effect to fabrics in an automatic dryer comprising commingling pieces of damp fabric by tumbling said fabrics under heat in a clothes dryer with an effective, i.e. softening, amount of the aforementioned sorbitan ester material.

DETAILED DESCRIPTION OF THE INVENTION

The articles herein are fashioned from fabric softening compositions containing certain "sorbitan ester" fabric softeners and from a dryer dispensing means, as more fully described hereinafter.

Fabric Softener Compositions

Fabric softening compositions employed herein contain as their essential component a sorbitan ester fabric softener. Such compositions can also contain a variety of optional materials.

Sorbitan Ester

The sorbitan ester fabric softener employed in the present invention comprises the esterified dehydration products of sorbitol. Sorbitol, itself prepared by the catalytic hydrogenation of glucose, can be dehydrated in well-known fashion to form mixtures of 1,4- and 1,5-sorbitol anhydrides (and small amounts of isosorbides) according to the following reaction: (See Brown, U.S. Pat. No. 2,322,821, issued June 29, 1943)

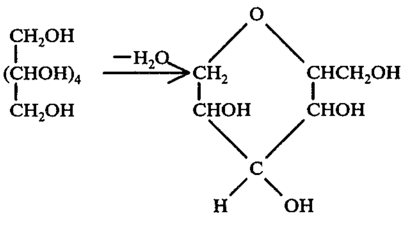

and

Sorbitol 1,5-Sorbitan

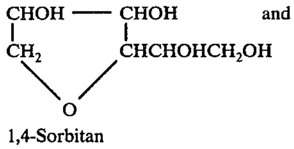

and

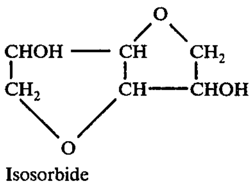

1,4-Sorbitan Isosorbide

The foregoing complex mixtures of anhydrides of sorbitol are collectively referred to herein as "sorbitan". It will be recognized that this "sorbitan" mixture will also contain some free, acyclic sorbitol.

Fabric softeners of the type employed herein can be prepared by esterifying the "sorbitan" mixture with a fatty acyl group in standard fashion, e.g., by reaction with a fatty acid halide or fatty acid. The esterification reaction can occur at any of the available hydroxyl groups, and various mono-, di-, etc., esters can be prepared. In fact, mixtures of mono-, di-, tri-, etc., esters almost always result from such reactions, and the stoichiometric ratios of the reactants can simply be adjusted to favor the desired reaction product.

For commercial production of sorbitan ester materials, etherification and esterification are generally accomplished in the same processing step by reacting sorbitol directly with fatty acids. Such a method of sorbitan ester preparation is described more fully in MacDonald, "Emulsifiers: Processing and Quality Control", *Journal of the American Oil Chemists' Society, Volume* 45, October, 1968.

The sorbitan mono-esters and di-esters are preferred components of the softening compositions utilized in the present invention. Compositions which predominate in mono- and di-esters of sorbitan appear to provide a greater degree of static control and are less likely to stain fabrics when such compositions are utilized within the dryer in the context of the present invention.

The mixtures of hydroxy-substituted sorbitan esters useful herein contain, inter alia, compounds of the following formulae, as well as the corresponding hydroxy-substituted di-esters.

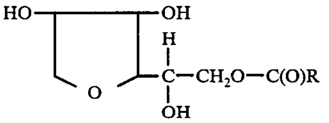

and

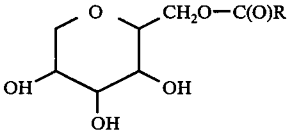

and

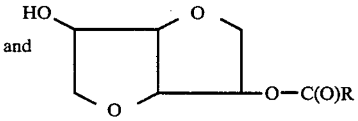

wherein the group RC(Q)— is a $C_{10}$–$C_{26}$, and higher, fatty alkyl residue. Preferably this fatty alkyl residue contains from 16 to 22 carbon atoms. The fatty alkyl residue can, of course, contain non-interfering substituents such as hydroxyl groups. Esterified hydroxyl groups can, of course, be either in terminal or internal positions within the sorbitan molecule.

The foregoing complex mixtures of esterified dehydration products of sorbitol (and small amounts of esterified sorbitol) are collectively referred to herein as "sorbitan esters". Sorbitan mono- and di-esters of lauric, myristic, palmitic, stearic and behenic (docosanoic) acids are particularly useful herein for imparting a soft, lubricious feel and antistatic benefit to fabrics. Mixed sorbitan esters, e.g., mixtures of the foregoing esters, and mixtures prepared by esterifying sorbitan with fatty acid mixtures such as the mixed tallow and hydrogenated palm oil fatty acids, are useful herein and are economically attractive. Unsaturated $C_{10}$–$C_{22}$ sorbitan esters, e.g., sorbitan mono-oleate, usually are present in such mixtures in low concentration. The term "alkyl" as employed herein to describe the sorbitan esters encompasses both the saturated and unsaturated hydrocarbyl ester side chain groups.

It is to be recognized that all sorbitan esters containing free —OH groups which soften and flow at dryer operating temperatures, i.e., about about 38° C, but which are solid below about 38° C, and which have fatty hydrocarbyl "tails", are useful softeners in the context of the present invention.

It will be further recognized that the water-insoluble derivatives of the sorbitan esters herein, especially the "lower" ethoxylates thereof (i.e., mono-, di- and tri-esters wherein one or more of the unesterified —OH groups contain one to about six oxyethylene moieties [Tweens ®]) are also useful in the articles and methods of the present invention. Therefore, for purposes of the instant invention, the term "sorbitan ester" includes such derivatives.

Preparation of the sorbitan esters herein can be achieved by dehydrating sorbitol to form a mixture of anhydrides of the type set forth above, and subsequently esterifying the mixture, for example, using a 1:1 stoichiometry for the esterification reaction. The esterified mixture can then be separated into the various ester components. Separation of the individual ester products is, however, difficult and expensive. Accordingly, it is easier and more economical not to separate the various esters, using instead, the total esterified mixture as the sorbitan ester component. Such mixtures of esterified reaction products are commercially available under various tradenames, e.g., Span ®. Such sorbitan ester mixtures can also be prepared by utilizing conventional interesterification procedures.

The preferred alkyl sorbitan esters for use in the softening compositions herein include sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate and mixtures thereof, and mixed coconutalkyl sorbitan mono- and di-esters and mixed tallowalkyl sorbitan mono- and di-esters. Such mixtures are readily prepared by reacting the foregoing hydroxy-substituted sorbitans, particularly the 1,4- and 1,5-sorbitans, with the corresponding acid or acid chloride in a simple esterification reaction. It is to be recognized, of course, that commercial materials prepared in this manner will comprise mixtures containing minor proportions of various tri-esters, tetra-esters, uncyclized sorbitol, fatty acids, polymers, isosorbide structures and the like. The presence or absence of such materials as minor components of the sorbitan ester mixtures is of no consequence to this invention. For most purposes, the commercially available sorbitan ester materials which comprise from about 20% to 60% by weight of the monoester component and from about 5% to 50% by weight of the di-ester component and which have melting points of at least about 38° C can be advantageously employed to soften clothes in the dryer in the manner of this invention. Highly preferred materials include sorbitan monostearate, sorbitan monopalmitate, and 1:10 to 10:1 (wt.) mixtures thereof. Both the 1,4- and 1,5-sorbitan stearates and palmitates are useful herein, inasmuch as their melting points are above 38° C.

It is to be recognized that the sorbitan esters from commercial sources, as well as those made in the manner disclosed herein, can contain up to about 15% by weight of esters of acids having a chain length of up to $C_{26}$, and greater, as well as some lower ($C_8$) acids. These materials can modify the the melting points of the ester mixtures, but sorbitan ester mixtures melting at 38° C, and above, preferably 38° C to about 68° C, can easily be selected for use herein.

The sorbitan ester materials described above can comprise 100% of the softening compositions herein. Generally, however, these materials will be employed in softening compositions which also contain a number of contaminants and/or optional additives described more fully below.

Optional Softening Composition Components

Various additives can also be used in combination with the sorbitan ester softening agent in the softening compositions herein. Although not essential to the invention herein, certain fabric treating additives are particularly desirable and useful, e.g., perfumes, brightening agents, shrinkage controllers, spotting agents, and the like.

Cationic anti-static and/or softening agents can optionally be added to the sorbitan ester-containing softener compositions to provide an additional increment of static control and fabric softening, but are not essential for this purpose. Such cationic antistatic agents act synergistically in combination with sorbitan esters to provide static control in the dryer superior to that obtained with either material alone.

Examples of cationic materials are those described in Morton, U.S. Pat. No. 3,686,025, issued Aug. 22, 1972 and Diery et al, U.S. Pat. No. 3,849,435, issued Nov. 19, 1974, both patents incorporated herein by reference. Particularly preferred materials of this type include quaternary ammonium salts such as dialkyl dimethyl ammonium chlorides, methylsulfates and ethylsulfates wherein the alkyl groups contain from about 10 to 20 carbon atoms. Examples of such preferred materials include ditallowalkyldimethylammonium methylsulfate, distearyldimethylammonium methylsulfate, dipalmityldimethylammonium methylsulfate and dibehenyldimethylammonium methylsulfate.

While not essential, liquids which serve as a carrier for the softening agents and other materials can also be employed as part of the softening compositions herein. Such liquids can be used, for example, to more evenly impregnate an absorbent substrate with the softening composition when such an absorbent substrate is employed (as discussed hereinafter) as the dispensing means for the instant compositions. When a liquid carrier is so used, it should preferably be inert or stable with the fabric softeners. Moreover, the liquid carrier used in substrate impregnation should be substantially evaporated at room temperatures, and the residue (i.e., the softening agent and other optional materials) should then be sufficiently hardened so as not to run or drip off the substrate, or cause the substrate to stick together when folded. Isopropyl alcohol or isopropyl alcohol/water mixtures are the preferred liquid carriers for substrate impregnation purposes. Methanol, ethanol, acetone, ethylene glycol, propylene glycol, alcohol ethoxylate nonionic surfactants and/or liquified fluorocarbons such as dichlorodifluoroethane and dichlorodifluoromethane can also be used as carriers either for dispensing the softening compositions in the dryer, for introducing the softening compositions into the dryer dispensing means or for facilitating release of the softening compositions from the dryer dispensing means.

Other additives can include anti-creasing agents, finishing agents, fumigants, lubricants, fungicides, and sizing agents. Specific examples of useful additives disclosed herein can be found in any current Year Book of the American Association of Textile Chemists and Colorists. Any additive used should be compatible with the softening agents.

The amounts of some additives (e.g., perfume and brighteners) that are generally used in combination with the softening agents are small, being in the range of from 0.01% to 10% by weight of the softening composition. Other additives such as the optional cationic antistatic/softening agents and liquid carriers can be present in larger amounts. Such cationic and/or liquid carrier materials can be present in fabric softening compositions to the extent of from about 0.01% to 50% or more by weight of the softening composition.

A highly preferred softening composition herein contains from about 65% to 95% by weight of the composition of the essential sorbitan ester component and from about 5% to 35% by weight of the composition of an optional cationic antistatic/softening agent.

Liquid carrier will, of course, be present in the softening composition in relatively large amounts, especially if presence of such a carrier is useful in dispensing the softening composition in the dryer. (In an aerosol device, for example.)

Dispensing Means

The sorbitan ester-containing softening compositions can be employed by simply adding a measured amount into the dryer, e.g., as liquid dispersion. However, in a preferred embodiment, the sorbitan ester softeners are provided as an article of manufacture in combination with a dispensing means which effectively releases the ester-containing composition in an automatic clothes dryer. Such dispensing means can be designed for single usage or for multiple uses.

One such article comprises a sponge material releasably enclosing enough softener composition to effectively impart fabric softness during several cycles of clothes. This multi-use article can be made by filling a hollow sponge with about 20 grams of the sorbitan ester. In use, the ester melts and leaches out through the pores of the sponge to soften fabrics. Such a filled sponge can be used to treat several loads of fabrics in conventional dryers, and has the advantage that it can remain in the dryer after use and is not likely to be misplaced or lost.

Another article comprises a cloth or paper bag releasably enclosing the sorbitan ester-containing softening composition and sealed with the hardened ester. The action and heat of the dryer opens the bag and releases the ester to perform its softening function.

Still another article comprises an aerosol cannister containing the above described softening compositions under pressure. The compositions can be dispensed from this aerosol article onto the dryer drum in the manner more fully described in Rudy et al, U.S. Pat. No. 3,650,816, issued Mar. 21, 1972, incorporated herein by reference.

Other devices and articles suitable for dispensing the softening material into automatic dryers include those described in Dillarstone, U.S. Pat. No. 3,736,668, issued June 5, 1973; Compa et al, U.S. Pat. No. 3,701,202, issued Oct. 31, 1972; Furgal, U.S. Pat. No. 3,634,947, issued Jan. 18, 1972; Hoeflin, U.S. Pat. No. 3,633,538, issued Jan. 11, 1972 and Rumsey, U.S. Pat. No. 3,435,537, issued Apr. 1, 1969. All of these patents are incorporated herein by reference.

A highly preferred article herein comprises the sorbitan ester-containing composition releasably affixed to a sheet of paper or woven or non-woven cloth substrate. When such an article is placed in an automatic laundry dryer, the heat and tumbling action of the dryer removes the composition from the substrate and deposits it on the fabrics.

The sheet conformation has several advantages. For example, effective amounts of the sorbitan esters for use in conventional dryers can be easily sorbed onto and into the sheet substrate by a simple dipping or padding process. Thus, the user need not measure the amount of ester necessary to obtain fabric softness. Additionally, the flat configuration of the sheet provides a large surface area which results in efficient release of the softener materials onto fabrics by the tumbling action of the dryer.

The water-insoluble paper, or woven or non-woven substrates used in the articles herein can have a dense, or more preferably, open or porous structure. Examples of suitable materials which can be used as substrates herein include paper, woven cloth, and non-woven cloth. The term "cloth" herein means a woven or non-woven substrate for the articles of manufacture, as distinguished from the term "fabric" which encompasses the clothing fabrics being dried in an automatic dryer.

Highly preferred paper, woven or non-woven "absorbent" substrates useful herein are fully disclosed in Morton, U.S. Pat. No. 3,686,025, issued Aug. 22, 1972, incorporated herein by reference. It is known that most substances are able to absorb a liquid substance to some degree; however, the term "absorbent" as used herein, is intended to mean a substance with an absorbent capacity (i.e., a parameter representing a substrate's ability to take up and retain a liquid) from 4 to 12, preferably 5 to 7, times its weight of water.

Determination of absorbent capacity values is made by using the capacity testing procedures described in U.S. Federal Specifications UU-T-595b, modified as follows:

(1) tap water is used instead of distilled water;
(2) the specimen is immersed for 30 seconds instead of 3 minutes;
(3) draining time is 15 seconds instead of 1 minute; and
(4) the specimen is immediately weighed on a torsion balance having a pan with turned-up edges.

Absorbent capacity values are then calculated in accordance with the formula given in said Specification. Based on this test, one-ply, dense bleached paper (e.g., kraft or bond having a basis weight of about 32 pounds per 3,000 square feet) has an absorbent capacity of 3.5 to 4; commercially available household one-ply toweling paper has a value of 5 to 6; and commercially available two-ply household toweling paper has a value of 7 to about 9.5.

Using a substrate with an absorbent capacity of less than 4 tends to cause too rapid release of the softening agent from the substrate resulting in several disadvantages, one of which is uneven softening of the fabrics. Using a substrate with an absorbent capacity over 12 is undesirable, inasmuch as too little of the softening agent is released to soften the fabrics in optimal fashion during a normal drying cycle.

The use of dense, one-ply or ordinary kraft or bond paper for the softening article substrate can result in increased staining of certain types of treated fabrics. This staining is caused by the low absorbent capacity of the paper substrate.

The softening composition on dense paper can be rapidly and unevenly released in excessive quantities when subjected to customary dryer temperatures, with the result that treated fabrics can become stained at points of contact with the softener-coated paper. Fabric staining can be minimized by employing a substrate having an absorbent capacity in the range of 4 to 12, such that less of the softening composition is released at any given point in time when contacted with the fabric being treated.

As noted above, suitable materials which can be used as a substrate in the invention herein include, among others, sponges, paper, and woven and non-woven cloth, all having the necessary absorbency requirements defined above. The preferred substrates of the softening compositions herein are cellulosic, particularly multi-ply paper and non-woven cloth.

More specifically, a preferred paper substrate comprises a compressible, laminated, calendered, multi-ply, absorbent paper structure. Preferably, the paper structure has 2 or 3 plies and a total basis weight of from 14 to 90 pounds per 3,000 square feet and absorbent capacity values within the range of 7 to 10. Each ply of the preferred paper structure has a basis weight of about 7 to 30 pounds per 3,000 square feet, and the paper structure can consist of plies having the same or different basis weights. Each ply is preferably made from a creped, or otherwise extensible, paper with a creped percentage of about 15% to 40% and a machine direction (MD) tensile and cross-machine (CD) tensile of from about 100 to 1,500 grams per square inch of paper width. The two outer plies of a 3-ply paper structure of each ply of a 2-ply paper structure are embossed with identical repeating patterns consisting of about 16 to 200 discrete protuberances per square inch, raised to a height of from about 0.010 inch to 0.40 inch above the surface of the unembossed paper sheet. From about 10% to 60% of the paper sheet surface is raised. The distal ends (i.e., the ends away from the unembossed paper sheet surface) of the protuberances on each ply are mated and adhesively joined together, thereby providing a preferred paper structure exhibiting a compressive modulus of from about 200 to 800 inch-grams per cubic inch and Handle-O-Meter (HOM) MD and CD values of from about 10 to 130.

Suitable adhesives for multi-ply paper are known in the art and include water, starches, wet-strength resins, and polyvinyl acetates. A particularly suitable adhesive is prepared by heating from about 2 to about 4 parts by weight of substantially completely hydrolyzed polyvinyl alcohol resin in from about 96 to about 98 parts by weight of water. Preferably, about 0.03 pound of adhesive solids are used to join 3,000 square feet of the embossed plies, with the adhesive being applied to the distal surfaces of the protuberances of one or all plies.

The compressive modulus values which define the compressive deformation characteristics of a paper structure compressively loaded on its opposing surfaces, the HOM values which refer to the stiffness or handle of a paper structure, the MD and CD HOM values which refer to HOM values obtained from paper structure samples tested in a machine and cross-machine direction, the methods of determining these values, the equipment used, and a more detailed disclosure of the paper structure preferred herein, as well as methods of its preparation, can be found in Wells; U.S. Pat. No. 3,414,459, issued Dec. 3, 1968, the disclosure of which is incorporated herein by reference.

The preferred non-woven cloth substrates used in the invention herein can generally be defined as adhesively bonded fibrous or filamentous products having a web or carded fiber structure (where the fiber strength is suitable to allow carding), or comprising fibrous mats in which the fibers or filaments are distributed haphazardly or in random array (i.e., an array of fibers in a carded web wherein partial orientation of the fibers is frequently present, as well as a completely haphazard distributional orientation), or substantially aligned. The fibers or filaments can be natural (e.g., wool, silk, jute, hemp, cotton, linen, sisal, or ramie) or synthetic (e.g., rayon, cellulose ester, polyvinyl derivatives, poly-olefins, polyamides, or polyesters).

Methods of making non-woven cloths are not a part of this invention and, being well known in the art, are not described in detail herein. Generally, however, such cloths are made by air- or water-laying processes in which the fibers or filaments are first cut to desired lengths from long strands, passed into a water or air stream, and then deposited onto a screen through which the fiber-laden air or water is passed. The deposited fibers or filaments are then adhesively bonded together, dried, cured, and otherwise treated as desired to form the non-woven cloth. Non-woven cloths made of polyesters, polyamides, vinyl resins, and other thermoplastic fibers can be span-bonded, i.e., the fibers are spun out onto a flat surface and bonded (melted) together by heat or by chemical reactions.

The absorbent properties preferred herein are particularly easy to obtain with non-woven cloths and are provided merely by building up the thickness of the cloth, i.e., by superimposing a plurality of carded webs or mats to a thickness adequate to obtain the necessary absorbent properties, or by allowing a sufficient thickness of the fibers to deposit on the screen. Any diameter or denier of the fiber (generally up to about 10 denier) can be used, inasmuch as it is the free space between each fiber that makes the thickness of the cloth directly related to the absorbent capacity of the cloth, and which, further, makes the non-woven cloth especially suitable for impregnation with a softening composition by means of intersectional or capillary action. Thus, any thickness necessary to obtain the required absorbent capacity can be used.

The choice of binder-resins used in the manufacture of non-woven cloths can provide substrates possessing a variety of desirable traits. For example, the absorbent capacity of the cloth can be increased, decreased, or regulated by respectively using a hydrophilic binder-resin, a hydrophobic binder-resin, or a mixture thereof, in the fiber bonding step. Moreover, the hydrophobic binder-resin, when used singly or as the predominant compound of a hydrophobic-hydrophilic mixture, provides non-woven cloths which are especially useful as substrates when the softening articles herein are used with damp fabrics in an automatic dryer.

When the substrate for the softening articles herein is a non-woven cloth made from fibers deposited haphazardly or in random array on the screen, the articles exhibit excellent strength in all directions and are not prone to tear or separate when used in the automatic clothes dryer.

Preferably, the non-woven cloth is water-laid or air-laid and is made from cellulosic fibers, particularly from regenerated cellulose or rayon. Such non-woven cloth can be lubricated with any standard textile lubricant. Preferably, the fibers are from 3/16 inch to 2 inches in length and are from 1.5 to 5 denier. Preferably, the fibers are at least partially oriented hapharzardly, particularly substantially hapharzardly, and are adhesively bonded together with a hydrophobic or substantially hydrophobic binder-resin, particularly with a nonionic self-crosslinking acrylic polymer or polymers. Preferably, the cloth comprises about 70% fiber and 30% binder-resin polymer by weight and has a basis weight of from about 18 to 24 grams per square yard.

The preferred fabric softening articles of the present invention are structured to be compatible with conventional laundry dryer designs. While it is preferred to employ the articles of the present invention in an automatic laundry dryer, other equivalent machines can be employed, and in some instances, heat and drying air may be omitted for part or all of the cycle. Generally, however, heated air will be employed and such air will be circulated frequently in the dryer. Normally, there are from about 5 to 50 volume changes of drying air in the dryer drum per minute and the air moves at about 125 to 175 cubic feet per minute. These changing volumes of air create a drawing or suction effect which can, especially with small fabric loads, cause an item such as a sock, handkerchief or the like, or a fabric conditioning article, to be disposed on the surface of the air outlet of the dryer. A usual load of fabrics of from about 4 to 12 pounds dry weight will fill from about 10% to 70% of the volume of most dryers and will normally pose little difficulty. A sufficient number of tumbling items will normally be present to prevent any item from being drawn to the exhaust outlet or to cause it to be removed from the outlet. In the event, however, a fabric softening article is caused to be disposed in relation to the air exhaust outlet in such a manner as to cause blockage of passing air, undesirable temperature increases can result. In the case of fabric softening articles prepared from the normally solid or waxy softeners such as the sorbitan esters which soften or melt under conditions of heat, the article may tend to adhere to an exhaust outlet.

The problem of blockage can be solved by providing openings in the article in the manner described in two U.S. patent applications of A. R. McQueary, one having Ser. No. 347,605, filed Apr. 3, 1973, now U.S. Pat. No. 3,944,694, issued Mar. 16, 1976 and the other having Ser. No. 347,606, filed Apr. 3, 1973, now U.S. Pat. No. 3,956,556, issued May 11, 1976, both incorporated herein by reference. More specifically, slits or holes are cut through the substrate to allow free passage of air.

The slit openings are provided in the preferred fabric softening articles of the invention for two principal purposes. Importantly, the slits permit passage of air in the event the article is placed in a blocking relationship to the air exhaust outlet. Moreover, the slit openings provide a degree of flexibility or resiliency which causes the article to crumple or pucker. The effect of such crumpling is that only a portion of the air exhaust outlet will be covered by the softening article in the event it is carried by the moving air stream to the exhaust outlet. Moreover, the crumpled article is more readily removed by tumbling fabrics than would be the case if the article were placed in a flat relationship to the exhaust outlet.

The type and number of slit openings can vary considerably and will depend upon the nature of the substrate material, its inherent flexibility or rigidity, the nature of the softening agent carried therein or thereon, and the extent to which increased passage of air therethrough is desired. The preferred articles of this invention can comprise a large number of small slits of various types or configurations, or fewer larger slits. For example, a single rectilinear or wavy slit, or a plurality thereof, confined to within the area of a sheet and extending close to opposite edges of the article, can be employed. By maintaining a border around all edges of the softening article, a desired degree of flexibility and surface area availability to tumbling fabrics can be maintained. While, for example, rectilinear slits can be cut into a softening article completely to the edges of the article, confinement of the slits to within the area of the article will be preferred where the convenience of packaging the softening article in roll form is desired.

According to one preferred embodiment of the invention, a sheet of fabric-softening article is provided with a plurality of rectilinear slits extending in one direction, e.g., the machine direction of the web substrate, and in a substantially parallel relationship. The slits can be aligned or in a staggered relationship. A preferred embodiment will contain from 5 to 9 of such slits which will extend to within about 2 inches and preferably 1 inch from the edge of the web material which is, for example, a 9 inch × 11 inch sheet. In general, the greater the number and the longer the slits, the greater the effect in preventing restriction of air flow. Such an article permits the individual panel areas or sections within the rectilinear slits to flex or move in independent relationship to each other and out of the plane of the sheet. This flexing minimizes the probability that such an article will align itself in a flat and blocking relationship to an exhaust outlet. The inherent puckering or crumpling tendency of the article allows the article to contact the air outlet in such a manner as to leave at least a portion of the air exhaust outlet uncovered. In addition, the tumbling fabrics in the dryer will collide with the crumpled article causing it be to removed from the exhaust outlet. Removal is readily accomplished by reason by the protrusion of the crumpled article which makes it more available for contact with the tumbling load of fabrics in the dryer.

The slit openings in the softening articles of the invention can be in a variety of configurations and sizes, as can be readily appreciated. In some instances, it may be desirable to provide slit openings as C-, U- or V-shaped slits. Such slits arranged in a continuous or regular or irregular pattern are desirable from the standpoint of permitting gate-like or flap structures which permit the passage of air therethrough.

In accordance with a preferred embodiment of the invention, a plurality of curvilinear slit openings, such as U-shaped, or C-shaped slits, are provided in a continuously patterned arrangement. These slit arrangements provide flat-like or gate-like structures which should approximate the size of the perforations normally employed in laundry dryer exhaust outlets. A width dimension of from about 0.02 to about 0.40 inch is preferred. U- or C-shaped slits, e.g., about $\frac{1}{8}$ inch in diameter, are desirably provided in close proximity to each other, e.g., about $\frac{1}{8}$ inch apart, as to simulate, for example, a fish-scale pattern. Such design, in addition to permitting passage of air, provides a degree of flexibility to the substrate and allows flexing or puckering of the article in use. Similarly, the slit openings can be arranged as spaced rows of slits or as a plurality of geometrical patterns. For example, a sheeted article of this invention can comprise a plurality of squares, circles, triangles or the like, each of which is comprised of a plurality of individual slits. Other embodiments include small or large S-shaped slits, X-slits or crosses, slits conforming to alphabetical or numerical patterns, logograms, marks, floral and other designs can also be employed.

As an alternative to slits, the article can be provided with one or more openings having a diameter of from about 0.02 inches to about 4 inches, from about 5% to about 40% of the surface area of the article comprising said openings. The openings can be disposed in any convenient relationship to one another but it is simplest, from a manufacturing standpoint, to punch the opening through the substrate in evenly spaced rows.

Article Manufacture

The articles herein comprise sorbitan ester-containing softener compositions in combination with any dispensing means suitable for releasing softening agent at temperatures encountered in automatic laundry dryers. Preferred articles herein are those wherein the softening composition is impregnated into or coated onto an absorbent substrate. The impregnation or coating can be accomplished in any convenient manner, and many methods are known in the art. For example, the softening composition, in liquid form, can be sprayed onto a substrate or can be added to a wood-pulp slurry from which the substrate is manufactured.

Impregnating, rather than coating, the substrate with the softener composition is highly preferred for optimal softening with minimal fabric staining. The term "coating" connotes the adjoining of one substance to the external surface of another; "impregnating" is intended to mean the permeation of the entire substrate structure, internally as well as externally. One factor affecting a given substrate's absorbent capacity is its free space. Accordingly, when a softening composition is applied to an absorbent substrate, it penetrates into the free space; hence, the substrate is deemed impregnated. The free space in a substrate of low absorbency, such as a one-ply kraft or bond paper, is very limited; such a substrate, is therefore, termed "dense". Thus, while a small portion of the softening composition penetrates into the limited free space available in a dense substrate, a rather substantial balance of the softener composition does not penetrate and remains on the surface of the substrate so that it is deemed a coating. The difference between coating and impregnation is believed to explain why the softener-impregnated sheet substrates of the invention herein eliminate or substantially reduce the staining of fabrics observed when a softener-coated dense substrate is utilized.

In one method of making the preferred softener-impregnated absorbent sheet substrate, a softener composition containing sorbitan ester alone or with the optional additives is applied to absorbent paper or nonwoven cloth by a method generally known as padding. The softening composition is preferably applied in liquid form to the substrate. Thus, the sorbitan ester-containing softener compositions which are normally solid at room temperature should first be melted and/or solvent treated with one of the liquid carriers mentioned hereinbefore. Methods of melting the softener composition and/or for treating the softener composition with a solvent are known and can easily be done to provide a satisfactory softener-treated substrate.

In another preferred method, the sorbitan ester-containing softener composition in liquified form is placed in a pan or trough which can be heated to maintain the softener composition in liquid form. The liquid softener composition contains any of the desired optional additives. A roll of absorbent paper (or cloth) is then set up on an apparatus so that it can unroll freely. As the paper or cloth unrolls, it travels downwardly and, submersed, passes through the pan or trough containing the liquid softener at a slow enough speed to allow sufficient impregnation. The absorbent paper or cloth then travels upwardly and through a pair of rollers which remove excess bath liquid and provide the absorbent paper or cloth with about 1 to about 12 grams of the sorbitan ester softening agent per 100 $in.^2$ to 150 $in.^2$ of substrate sheet. The impregnated paper or cloth is then cooled to room temperature, after which it can be folded, cut or perforated at uniform lengths, and subsequently packaged and/or used.

The rollers used resemble "squeeze rolls" used by those in the paper and paper-making art; they can be made of hard rubber or steel. Preferably, the rollers are adjustable, so that the opening between their respective surfaces can be regulated to control the amount of the softener composition liquid on the paper or cloth.

In another method of impregnation, the softener composition, in liquid form, is sprayed onto absorbent paper or cloth as it unrolls and the excess softener is then squeezed off by the use of squeeze rollers or by a doctor-knife. Other variations include the use of metal "nip" rollers on the leading or entering surfaces of the sheets onto which the softening composition is sprayed; this variation allows the absorbent paper or cloth to be treated, usually on one side only, just prior to passing between the rollers whereby excess softener is squeezed off. This variation can optionally involve the use of metal rollers which can be heated to maintain the softener composition in the liquid phase. A further method involves separately treating a desired number of the individual plies of a multi-ply paper and subsequently adhesively joining the plies with a known adhesive-joinder compound; this provides an article which can be untreated on one of its outer sides, yet contains several other plies, each of which is treated on both sides.

In applying the softener composition to the absorbent substrate, the amount of softener composition (containing up to 100% by weight of sorbitan ester) impregnated into or coated onto the absorbent substrate is conveniently in the weight ratio range of from about 10:1 to 0.5:1 based on the ratio of total softener composition to dry, untreated substrate (fiber plus binder). Preferably, the amount of the softener composition ranges from about 5:1 to about 1:1, most preferably from about 3:1 to 1:1, by weight of the dry, untreated substrate.

Following application of the liquified softener composition, the articles are held at room temperature until the softener composition solidifies. The resulting dry articles, prepared at the softener composition:substrate ratios set forth above, remain flexible; the sheet articles are suitable for packaging in rolls. The sheet articles can optionally be slitted or punched to provide a non-blocking aspect at any convenient time during the manufacturing process.

The most highly preferred articles herein are those where the sorbitan ester-containing softener composition is releasably affixed to a sheet substrate of the type disclosed hereinabove having an absorbent capacity of from about 4 to about 12. A highly preferred substrate for such an article has an absorbent capacity of from about 5 to 7. The most highly preferred substrate for the articles comprises a water-laid or air-laid non-woven cloth consisting essentially of cellulosic fibers, said fibers having a length of about 3/16 inch to about 2 inches and a denier from about 1.5 to about 5, said fibers being at least partially oriented haphazardly, and adhesively bonded together with a binder-resin. Such water-laid or air-laid non-woven cloths can easily be prepared having the preferred absorbent capacities set forth above.

The most highly preferred articles herein are those wherein the flexible substrate is provided with openings sufficient in size and number to reduce restriction by said article of the flow of air through the automatic dryer. Articles wherein the openings comprise a plurality of rectilinear slits extending along one dimension of the substrate, especially those wherein the slits extend to within 1 inch from at least one edge of said dimension of the substrate, articles wherein the slits comprise a plurality of curvilinear slits in a continuous pattern of U-shaped or C-shaped slits, and articles wherein the openings comprise circular holes, are highly preferred herein.

It is most convenient to provide an article in the form of a non-blocking sheet substrate having the physical parameters noted hereinabove, said substrate having an area of from about 50 $in.^2$ to about 200 $in.^2$, containing from about 1.5 grams to about 7.5 of the sorbitan ester releasably impregnated in said substrate. Such articles can be provided with, as additional components, other fabric treating additives of the type disclosed hereinabove. The articles are provided with openings such as the holes or slits described hereinabove, said openings comprising from about 0.5% to about 75%, preferably 5% to about 40%, of the area of the article, said openings being so disposed as to provide a non-blocking effect.

It should be noted that the preferred absorbent substrate articles described above are surprisingly easy to manufacture on a commercial scale. Production of these substrates with the particular sorbitan ester-containing softening compositions of the instant invention generally results in a significantly lower level of softener composition dusting and build-up on machinery in comparison to dusting and build-up resulting from the manufacture of similar prior art products utilizing quaternary materials alone.

Usage

In the method aspect of this invention the sorbitan ester softeners are used in an effective amount to soften and condition fabrics in an automatic laundry dryer. The effective, i.e., softening and static-controlling, amount of the sorbitan esters used in the manner of this invention will depend somewhat on the type of fabric being treated and the dampness of the surrounding atmosphere. For example, it is well-known that under conditions of low humidity, static control in fabrics is somewhat more difficult to achieve than under conditions of high humidity.

For most purposes, sorbitan esters are applied to fabrics at a rate of about 0.01 gram to about 12 grams, preferably 1 g. to about 3 g., per 5 lbs. of fabrics on a dry fabric weight basis. Higher usage rates can be employed, if desired, but can result in an undesirable greasy feel on the fabrics.

The method herein is carried out in the following manner. Damp fabrics, usually containing from about 1 to about 1.5 times their weight of water, are placed in the drum of an automatic clothes dryer. In practice, such damp fabrics are commonly obtained by laundering, rinsing and spin-drying the fabrics in a standard washing machine. The sorbitan esters either alone or in combination with other additives are simply spread uniformly over all fabric surfaces, for example, by sprinkling a sorbitan-ester-containing composition onto the fabrics from a shaker device. Alternatively, the sorbitan ester-containing compositions can be sprayed or otherwise coated on the dryer drum, itself. The dryer is then operated in standard fashion to dry the fabrics, usually at a temperature from about 50° C to about 80° C for a period from about 10 minutes to about 60 minutes, depending on the fabric load and type. On removal from the dryer, the dried fabrics are softened. Moreover, the fabrics instantaneously sorb a minute quantity of water which increases the electrical conductivity of the fabric surfaces, thereby quickly and effectively dissipating static charge.

In a preferred mode, the present process is carried out by fashioning an article comprising the substrate-like dispensing means of the type hereinabove described in releasable combination with a sorbitan ester-containing softener composition. This article is simply added to a clothes dryer together with the damp fabrics to be treated. The heat and tumbling action of the revolving dryer drum evenly distributes the softener composition over all fabric surfaces, and dries the fabrics.

The following are non-limiting examples of the instant articles and methods.

EXAMPLE I

A dryer-added fabric softening article is prepared by sprinkling 5.0 grams of a sorbitan ester mixture comprising about 50% (wt.) of 1,4-sorbitan monostearate uniformly over the surface of an air-laid non-woven cloth comprising 70% regenerated cellulose (American Viscose Corporation) and 30% hydrophobic binder-resin (Rhoplex HA-8 on one side of the cloth, and Rhoplex HA-16 on the other side; Rohm & Haas Co.). The cloth has a thickness of 4 to 5 mils, a basis weight of about 24 grams per square yard and an absorbent capacity of 6. A one foot length of the cloth, 8-1/3 inches wide, weighs about 1.78 grams. The fibers in the cloth are ca. 1/4 inch in length, 1.5 denier, and are oriented substantially haphazardly. The fibers in the cloth are lubricated with sodium oleate. The substrate cloth is 10 inch × 11 inch. The sorbitan ester-covered cloth is transferred to a heated plate, whereupon the ester melts and impregnates the interfiber free space in the cloth substrate. The article is removed from the hot plate and allowed to cool to room temperature, whereby the ester solidifies. The cloth retains its flexibility.

Following solidification of the sorbitan ester, the cloth is slitted with a knife. (Conveniently, the cloth is provided with 5 to 9 rectilinear slits extending along one dimension of the substrate, said slits being in a substantially parallel relationship and extending to within about one inch from at least one edge of said dimension of the substrate.) The width of an individual slit is ca. 0.2 inches.

An article prepared in the foregoing manner is placed in an automatic clothes dryer together with 5 lbs. of freshly washed, damp (ca. 5.5 lbs. water) mixed cotton, polyester, and polyester/cotton blend clothes. The automatic dryer is operated at an average temperature of 60° C for a period of 45 minutes. During the course of the drying operation the clothes and softener article are constantly tumbled together by the rotation of the dryer drum. After the drying cycle, the clothes are removed from the dryer into a room having a relative humidity of 50%. The clothes are found to exhibit excellent softness and anti-static properties.

Equivalent results are secured when, in the foregoing article, the 1,4-sorbitan monostearate is replaced by an equivalent amount of a 1:1 (wt.) mixture of 1,4-sorbitan monostearate and 1,4-sorbitan distearate; a 1:1 (wt.) mixture of 1,4-sorbitan monostearate and 1,5-sorbitan monostearate; a 1:1 (wt.) mixture of 1,4-sorbitan monostearate and 1,5-sorbitan distearate; a 1:1 (wt.) mixture of 1,4-sorbitan distearate and 1,5-sorbitan monostearate; and a 1:1 (wt.) mixture of 1,4-sorbitan distearate and 1,5-sorbitan distearate, respectively.

EXAMPLE II

A dryer-added fabric softening article is prepared in the following manner. SPAN 60 (ICI America's commercial mixture of sorbitan "stearate" comprising a total of about 90% by weight total sorbitan and isosorbide fatty esters, and approximately equal amounts of free fatty acid, free sorbitol, free sorbitan, minor proportions of isosorbide, about 31% by weight of the mixture comprising sorbitan monoesters) is placed in a trough and heated until melted.

A 10 inch wide roll of paper substrate is utilized, said substrate being a compressible, laminated and calendered absorbent paper structure comprising two extensible paper sheets, each sheet (or ply) having a basis weight of about 16 lbs. per 3,000 square feet and a MD value of about 660, a CD value of about 380 and 20% dry-crepe. Each sheet of the paper substrate is embossed with identical raised patterns consisting of about 70 inwardly directed discrete protuberences per square inch, raised about 0.02 inches above the surface of the paper sheets. The protuberences constitute about 45% of the surface of each sheet and are mated and adhesively joined with polyvinyl alcohol resin. The paper structure exhibits a compressive modulus of about 340 together with HOM MD/CD values of about 36/31 and has an absorbent capacity of about 7. (This paper is a particularly preferred paper substrate herein and weighs about 3.7 grams per 10 inch × 12 inch sheet).

The paper sheet substrate is mounted on a roll and is unrolled in the trough. The paper travels at a rate of 5–6 feet per minute and is then directed upwardly and through the pair of hard, rubber rollers mounted so that their surfaces just touch. The turning rollers squeeze off excess softener liquid and impregnate the paper with the softener at a softener:paper impregnation ratio of about 2.7:1 by weight of the dry, untreated paper. After passing through the rollers, the liquified softener (now impregnated into the paper) is cooled and hardened. The resulting paper article is substantially solid, yet flexible, is stable to decomposition, not "runny" or dripping, and which, although waxy to the touch, does not stick together when folded.

A 10 in. × 12 in. paper-impregnated article prepared in the foregoing manner is punched with 9 evenly-spaced 0.5 in. diameter holes. The resulting article has about 9 grams of the SPAN 60 on its surface, i.e., approximately 5.5 total grams of sorbitan mono- and distearate. The article is placed in an automatic clothes dryer together with five lbs. of mixed clothes which are dampened with an equal amount of water. The dryer is operated at an average temperature of 56° C for a period of 40 minutes, with tumbling. At the end of the drying cycle, the clothing is removed from the dryer and is found to be provided with an excellent soft and anti-static finish. The dryer operates without any vent blockage.

In the foregoing article the SPAN 60 is replaced by an equivalent amount of SPAN 40 (the corresponding complex mixture of sorbitan palmitates marketed by ICI America) and equivalent performance results are secured.

An article according to Example II is prepared using an equivalent amount of mixed sorbitan stearates and palmitates prepared by mixing the SPAN 60 and SPAN 40 at weight ratios of SPAN 60:SPAN 40 of 5:1; 2:1; 1:2; and 1:5, respectively, and equivalent performance results are secured.

EXAMPLE III

A non-staining dryer-added softener article is prepared as follows. 10 Grams of DURTAN 60 (Durkee Industrial Foods Group/SCM Corp.; comprising greater than 30% by weight stearic and palmitic acid esters of sorbitan, free stearic acid, free palmitic acid, free sorbitol, free sorbitan and minor amounts of isosorbide and esters thereof) are added to 25 mls. of isopropyl alcohol. 0.5 Gram of ditallowalkyldimethylammonium methylsulfate, 0.1 g. of mixed coconut alcohol ethoxylates having an average degree of ethoxylation of 6, and 0.01 g. of perfume are added to the mixture. The mixture is stirred and warmed to about 35° C to provide a free flowing slurry of the fabric treating components.

The substrate used is a 11 in. × 12 in. water-laid, non-woven cloth commercially available from C. H. Dexter Division of Dexter Corp., comprising fibers of regenerated cellulose, about 3/8 in. in length, about 1.5 denier, and lubricated with a standard textile lubricant. The fibers comprise about 70% of the non-woven cloth by weight and are oriented substantially haphazardly; a binder-resin (HA - 8) comprises about 30% by weight of the cloth. The cloth is about 4 mils thick, has a basis weight of about 24 grams per square yard and an absorbent capacity of 5.7. One foot length of the cloth, 8 1/4 inches wide, weighs about 1.66 grams.

The substrate cloth is placed in a shallow trough and is sprayed uniformly with the above-described isopropyl alcohol mixture. Four separate sprayings are used, i.e., each spraying uses ca. 1/4 of the above-described mixture. The isopropyl alcohol is allowed to evaporate from the substrate after each spraying. After the final spraying, the article is allowed to dry at room temperature, overnight. The final article is substantially free from isopropyl alcohol, is flexible, and contains the fabric treating components uniformly impregnated in the substrate free space.

The article prepared in the foregoing manner is placed in an automatic dryer together with 5.5 lbs. of damp (3 lbs. water) clothes and the dryer is operated with tumbling at an average temperature of 65° C for a period of 35 minutes. On removal from the dryer, the clothes are found to be provided with a uniform soft and anti-static finish. The clothes are also left with a pleasant perfume odor.

In the foregoing procedure, the isopropyl alcohol is replaced by an equivalent amount of ethyl alcohol (95%) and equivalent performance results are secured.

EXAMPLE IV

A through-the-dryer fabric softener composition in aerosol form is as follows. 25 Grams of GLYCOMUL P (Glyco Chemicals' mixture of palmitic acid esters of sorbitan) are admixed with 50 mls. of isopropyl alcohol until a homogeneous mixture is secured. The mixture is placed in a suitable aerosol container to which is added 15 mls. of a 1:1 (wt.) mixture of liquified dichlorodifluoroethane and dichlorodifluoromethane propellant gas. Following the pressure fill, the aerosol can is provided with a standard actuator valve and dip tube extending to the bottom of the can.

A standard laundry dryer drum, at ambient temperature, is sprayed uniformly with 10 grams of the aerosol composition. 5 Pounds of damp clothing containing about 5 lbs. of water are added to the dryer drum, and the dryer is operated in standard fashion at a temperature averaging around 57° C for a period of 35 minutes. After the drying cycle is over, the clothes are allowed to come to ambient temperature and are removed from the dryer. The clothes are found to be provided with a soft, anti-static finish.

EXAMPLE V

A fabric conditioning article in a sheet configuration is prepared in the following manner. The mode of preparation illustrates the advantages of the sheet configuration for the article, inasmuch as a high speed line can be employed in its manufacture. Moreover, the article can conveniently be packaged in roll form, with individual sheets having a pre-measured amount of fabric softener being circumscribed by perforations at regular intervals on the roll.

Sorbitol and mixed hydrogenated tallow fatty acids are admixed at a 1:1 molar ratio of sorbitol:total fatty acids. The hydrogenated tallow fatty acids employed comprise greater than 90% by weight of $C_{10}$-$C_{18}$ saturated and unsaturated acids, with a high percentage of the acids lying in the $C_{16}$-$C_{18}$ range. 0.1 Mole of boron trifluoride (as $BF_3 \cdot Et_2O$) is added to the reaction mixture, which is then refluxed with heat until approximately 2 moles of water are removed. The resulting reaction mixture is held at reflux for an additional hour, and is then neutralized with 0.1 molar sodium hydroxide solution. The reaction product is washed twice with 1 liter portions of water. The mixed sorbitan ester reaction products are salted out of the mixture with brine and are dissolved in isopropyl alcohol. The isopropyl alcohol solution is dried with molecular sieves, and the substantially anhydrous sorbitan esters are recovered by filtration and evaporation of the solvent.

The mixed tallowalkyl sorbitan esters prepared in the foregoing manner are placed in a flat, shallow trough and are liquefied by warming. A non-woven cloth substrate of the type disclosed hereinabove in Example I, 11 inches in width, is passed through the liquefied tallowalkyl sorbitan esters at a rate of 500 linear feet per minute. The substrate sheet coated with the liquefied esters is passed through a series of rollers adjusted to exert about 5 lbs. per square inch pressure on the substrate sheet. The resulting sheet contains about 6 grams - 7 grams of sorbitan esters per 120 $in.^2$, said esters being impregnated in the free space of the substrate. The substrate is then passed through an array of 9 knives disposed to provide rectilinear slits extending along the machine axis. Slits having an average width of 0.4 inches are thereby provided. The substrate is perforated at 12 inch intervals and the knives are disposed to slit the substrate to within 1 inch of the perforations. The resulting article is non-tacky, non-blocking and is conveniently packaged in roll form.

In use, an article prepared in the foregoing manner is torn from the roll at a perforation and is placed together with damp fabrics in an automatic dryer in the manner disclosed hereinabove. The dryer is operated in standard fashion, with tumbling, and a significant amount of the sorbitan ester softener is removed from the substrate sheet and is uniformly deposited on the fabric surfaces to provide a soft, anti-static finish.

In the foregoing article, the mixed tallowalkyl sorbitan esters are replaced with an equivalent amount of mixed coconutalkyl sorbitan esters, and equivalent results are secured.

In the foregoing article, the mixed tallowalkyl sorbitan esters are replaced by an equivalent amount of 1,4-sorbitan monolaurate, 1,4-sorbitan monopalmitate, 1,4-sorbitan dimyristate, 1,4-sorbitan dipalmitate, 1,4-sorbitan distearate, 1,4-sorbitan dibehenate, 1,4-sorbitan dieicosanate, and mixtures of the foregoing compounds with their 1,5-sorbitan ester analogs, and equivalent softening and anti-static benefits are secured.

The foregoing article is modified by adding 0.2 grams of any of the following adjunct materials to each article: ditallowalkyl dimethyl ammonium methylsulfate (anti-static agent); eicosyldiethylamine oxide (softener); bis-(styrylsulfonate)-biphenyl (dryer-compatible optical brightener); and p-chlorophenol (biocide). The resulting articles distribute the adjunct materials evenly over fabrics by virtue of the tumbling action of an automatic dryer to provide their indicated benefits.

EXAMPLE VI

A fabric softening article in sheet configuration is prepared by impregnating a flexible non-woven substrate with a liquid fabric softening composition.

The flexible substrate utilized is non-woven and made of rayon fiber (~70%) and polyvinyl acetate binder (~30%). Fiber utilized is approximately 1 and 9/16 inches in length and denier of 3. The substrate has an absorbent capacity of about 6.5 and is provided in a roll which contains detachable sheets which are 9 inches by 11 inches in size.

The flexible substrate is impregnated with a softening composition containing a mixture of sorbitan esters. The sorbitan ester component of the softening composition comprises the $C_{16}$ and $C_{18}$ alkyl mono, di, tri and tetra esters of sorbitan, isosorbide and small amounts of sorbitol (collectively "sorbitan esters") and is obtained as a commercial product from Mazer Chemical, Inc. (Mazer SMAZ-60). This sorbitan ester mixture contains from about 52% to 59% by weight of the $C_{16}$ material and from about 41% to 48% by weight of the $C_{18}$ material. The sorbitan ester mixture further comprises from about 34% to 37% by weight of the monoester component, from about 34% to 40% by weight of the diester component and from about 25% to 30% by weight of the tri and tetra ester component. The total softening agent mixture contains from about 92% to 95% by weight of the sorbitan ester materials, with the balance of the softening composition comprising optional materials.

The softening composition as described above is liquefied by heating and is then coated onto one side of the flexible substrate being fed from a roll in a high speed line operation. The coated side of the substrate is contacted with a rotating cylindrical member which serves to press the liquefied softening composition into the interstices of the substrate. The substrate is passed over several chilled tensioning rolls which help solidify the softening composition impregnated into the substrate sheet. The substrate sheet is 9 inches wide and is perforated in lines at 11 inch intervals to provide detachable sheets. Each sheet is cut with a set of knives to provide six parallel slits in the sheet 1 and 3/16 inches apart. Such slits average in length from 5 to 7 inches.

The impregnated substrate has an average total impregnate to substrate weight ratio of about 2.0:1. Sheets contain an average of about 2.85 grams of impregnate per sheet. (An average of about 2.65 grams per sheet of the sorbitan ester material.)

Such a fabric softening article can be utilized in the laundry dryer to provide fabric softening and anti-static benefits with minimal fabric staining.

EXAMPLE VII

A fabric softening article substantially similar to the Example VI article is prepared with a slight variation in the softening composition. In this Example VII article, the softening composition contains about 92.9% by weight of a sorbitan ester mixture obtained from a commercially available product marketed by Durkee Industrial Foods Group/SCM Corporation (Durtan 60K). This sorbitan ester mixture contains about 49.8% by weight of the $C_{16}$ material and about 50.2% by weight of the $C_{18}$ material. The sorbitan ester mixture further comprises about 34.6% by weight of the monoester component, about 42.1% by weight of the diester component and about 23.3% by weight of the tri and tetra ester component.

The Example VII article has an average total impregnate/substrate weight ratio of about 2.1:1. Sheets of this article contain an average of 3.0 grams of impregnate per sheet. (About 2.84 grams per sheet of the sorbitan ester material.)

This Example VII article, like the Example VI article, can be utilized in the laundry dryer to provide fabric softening and anti-static benefits with minimal fabric staining. Substantially similar fabric softening and anti-static performance results are obtained when, in the Example VII article, about 0.28 gram of the sorbitan ester material is replaced with ditallowalkyl dimethyl ammonium methylsulfate as an auxiliary softener and anti-static agent. In such an article the sorbitan ester material comprises about 84% by weight of the softening composition and the methylsulfate material comprises about 9% by weight of the softening composition.

EXAMPLE VIII

A fabric softening article substantially similar to the Example VI article is prepared with another variation in the softening composition. In the Example VIII article, the softening composition contains about 78% by weight of a sorbitan ester mixture obtained from a commercially available product marketed by Mazer Chemical, Inc. The sorbitan ester mixture employed contains about 58.7% by weight of the $C_{16}$ material and about 41.3% by weight of the $C_{18}$ material. The sorbitan ester mixture further comprises about 34.8% by weight of the monoester component; about 40% by weight of the diester component and about 25.2% by weight of the tri and tetra ester component.

The softening composition of the Example VIII article further comprises about 18.8% by weight of ditallowalkyl dimethyl ammonium methylsulfate as an auxiliary softener and antistatic agent.

The Example VIII article has an average total impregnate/dry substrate weight ratio of about 2.1:1.

Sheets of of this article contain an average of about 3.1 grams of impregnate per sheet (about 2.42 grams per sheet of the sorbitan ester material and about 0.58 gram per sheet of the quaternary ammonium material).

Like the other exemplified articles of the instant invention, the Example VIII article can be utilized in the laundry dryer to provide fabric softening and antistatic benefits with minimal dryer drum paint softening or corrosion.

Fabric Softening Evaluation

The fabric softening performance of certain of the articles of the instant invention is determined by means of a fabric softening evaluation. In such an evaluation, 5¼ lb. loads of fabrics representing a range of fabric types (cotton, polyester-cotton, polyester, acrylics, and nylon) are washed using a leading detergent, a ten-minute wash cycle with hot (125° F) medium hardness (8–10 grain/gallon) water, a two minute rinse in warm (100° F) water, and are dried for 45 minutes in standard household clothes dryers. Included in each 5¼ pound fabric load are four 100% cotton terrycloths to be used for softness grading. (All these terries are pre-treated in the following manner to remove any "factory finishes": Terries are laundered using Cheer detergent, a ten-minute wash cycle with hot (125° F) medium hardness (8–10 grain/gallon) water, and a two-minute rinse in warm (100° F) water. The entire wash and rinse cycles are repeated; the terries are then dried and added to the test wash load.) Drying is carried out using no fabric softening material as a control and using articles of the type described in Example VI as test articles.

Following washing and drying, the cotton terrycloths are graded "blind" by three qualified judges to determine the softness performance of the different treatments (products). The comparisons between treatments are expressed in terms of grading scale units (GSU) where 0 GSU = No Difference
1 GSU = A Slight Difference
2 GSU = A Moderate Difference
3 GSU = A Large Difference
4 GSU = A Very Large Difference All threatment comparisons (judges' grades) are summarized and subjected to a statistical one-way analysis of variance. The treatment relationships are reported in terms of grading scale units (GSU) along with a statistical estimate of test precision. (Least Significant Difference, i.e. LSD)

For softness evaluation, the articles of the present invention tested are the articles described in Example VI.

These articles are compared with various prior art articles comparable to the Example VI articles but wherein all the softener material is di(tallowalkyl) dimethylammonium methylsulfate. About 99% of the impregnate in these prior art articles is the methylsulfate quaternary material. Such articles have an average total impregnate to substrate weight ratio of about 2:1.

The Example VI articles of the present invention and various prior art methylsulfate articles such as described above are evaluated in separate tests, but both types of articles are compared to a "no softener" control.

Results of the softness grading are summarized in Table I.

Table I

| | Average Softening Grade* (Grading Scale Units) |
|---|---|
| No Softener (Control) | 0 |
| All-Methylsulfate Articles | 1.5 |
| Example VI Articles | 1.8 |

*LSD = 0.4 units

These data demonstrate that the articles of the instant invention provide fabric softening performance comparable to that of similar methylsulfate prior art fabric softening articles.

Paint Softening Evaluation

The effect which articles of the present invention have on dryer drum paint is measured by means of a "Pencil Hardness" paint softening evaluation.

In such an evaluation, a product to be tested (in the form of a sheet of a flexible substrate) is placed between a 1 inch × 3 inch painted metal test strip and a glass cover plate. The paint tested is an epoxy paint commonly utilized on some commercial dryer drums.

Samples so prepared are stored in closed jars at 180° F and ambient humidity for 24, 48, and 72 hours. After each time period the samples are removed and the "pencil hardness" of the paint on the test strips is measured.

From such hardness measurements twelve pencils ranging in hardness from 6B to 6H are ground flat with fine sandpaper and then sharpened with a #17 sharpener. Each pencil is rubbed across the painted metal plate at a 45° angle with a force which is just below that required to break the pencil lead. The "pencil hardness" is the softest pencil which will scratch the paint and is a common parameter used within the paint industry. Grading is on a scale of 0 to 12 with 0 corresponding to a 4B pencil lead and 12 corresponding to a 6H pencil lead. The higher the pencil hardness rating the harder the paint. A difference of 2 units on this scale is significant. Tests are run in triplicate and an average pencil hardness value for each plate is obtained.

The substrates tested are (a) the substrates described in Example VII, (b) prior art methylsulfate articles described above for the fabric softening evaluation, and (c) a second type of prior art article similar to the Example VI-VII articles but which utilize a ditallowalkyldimethyl ammonium chloride fabric softening agent. The prior art articles utilizing the chloride softener employ an impregnate containing about 85% by weight of the quaternary ammonium chloride and an average total impregnate to substrate weight ratio of about 2.4:1. These "chloride" articles contain an average of about 2.8 grams of the quaternary material per sheet.

The Example VI articles and the prior art articles are evaluated in separate tests, but the results are nonetheless indicative of the relative propensity of such articles to soften dryer drum paint.

Paint softening results are summarized in Table II.

Table II

| | Average Pencil Hardness (Pencil Hardness Scale 0-12) | | |
|---|---|---|---|
| Articles Tested | 24 Hours | 48 Hours | 72 Hours |
| Example VII Articles | 10 | 10 | 10 |
| Example VI-VII Type Articles, Methylsulfate Softener | — | — | 6.5 |
| Example VI-VII Type Articles, Chloride | | | |

Table II-continued

| Articles Tested | Average Pencil Hardness (Pencil Hardness Scale 0-12) 24 Hours | 48 Hours | 72 Hours |
|---|---|---|---|
| Softener | — | — | 0 |

The above paint softening data demonstrate that the dryer fabric softening articles of the present invention are significantly less harmful to dryer drum paint than those dryer fabric conditioning articles of the prior art which contain only quaternary ammonium methylsulfate or quaternary ammonium chloride fabric softening agents.

Dryer Corrosion Testing

The propensity of various fabric softening articles of the type described above to contribute to corrosion of automatic clothes dryers is evaluated by means of several types of dryer corrosion testing. In one test method, pre-weighed plates (1½inch × 4 inch) of cold-rolled carbon steel (Type 1018) are fastened in the drums of Kenmore electric dryers. Mixed fabric loads weighing 5½pounds are washed in conventional manner in water of 8 grains/gallon hardness and dried in the test dryers for 45 minutes along with the articles being tested. After 16 washing and drying cycles, the plates are removed and stored in an environment at 80° F and 80% relative humidity for either 7 days or 14 days.

After that time the test plates are visually graded for rusting on a scale of 0 to 16 (Higher grades mean more rusting). The plates are also weighed inasmuch as weight gain (i.e., pickup of oxygen and water) can be taken as a measure of increased rusting. For small amounts of rusting (i.e., at visual grades equal to or less than 4), visual testing results are very reproducible. For higher rusting levels, the weight gain rusting measurements tend to be more meaningful. Both visual and weight gain comparative rusting measurements are provided in Table IV for the Example VI articles and for methylsulfate and chloride prior art articles such as those used in the paint softening evaluation described above.

Table IV

| Softening Means Employed | Average Rusting Grades Visual (Grading Units) 7 Days | 14 Days | Weight Gain (Mg.) 7 Days | 14 Days |
|---|---|---|---|---|
| Example VI Articles | 0 | 1 | 0 | 0 |
| Example VI-VII Type Articles, Methylsulfate Softener | 8 | — | 10 | — |
| Example VI-VII Type Articles, Chloride Softener | 14 | — | 34 | — |

The above corrosion data demonstrate that the fabric softening articles of the present invention tend to promote corrosion of dryer drum metal to a much lesser extent than similar prior art articles employing chloride or methylsulfate softening agents.

In a second method for testing dryer drum corrosion, fabric softening articles are tested in automatic gas dryers having bare metal drums. Such unpainted dryer drums, or sections thereof, have been subjected to all pretreating and cleaning processes normally employed in the manufacture of commercially-available automatic dryers.

Dryers utilized are located in a laboratory with climatological conditions ranging from 80° F to 90° F and 80% to 95% relative humidity. Mixed fabric loads weighing 7 pounds are washed and dried in the same manner as described above. Dryers containing the test articles are operated on the basis of 16 cycles per day, five days per week. Such dryers remain in the laboratory for 16 days. Rusting levels in each dryer are graded visually, again on a 0 to 16 scale. In such testing, dryers run with articles such as described in Example VIII are compared with dryers run with no rinse-added or dryer-added softener at all. Results are provided in Table V.

Table V

| Fabric Softening Means | Rusting Grade at 92 Hours of Dryer Running Time (Grading Units) |
|---|---|
| No Softener | 6.8 |
| Example VIII Articles | 1.6 |

The Table V data demonstrate that fabric softening articles of the instant invention which contain a major amount of the sorbitan ester softening agent actually serve to inhibit the corrosion of automatic dryer drums that occurs even in the absence of fabric softener. Substantially similar corrosion inhibition results are obtained when the Example VIII-type articles utilize softening compositions containing sorbitan ester as the sole softening agent.

What is claimed is:

1. A method for imparting a softening and anti-static effect to fabrics in an automatic laundry dryer comprising commingling pieces of damp fabrics by tumbling said fabrics under heat in an automatic clothes dryer with an effective amount of a fabric softening composition, said composition having a melting point greater than about 38° C and being flowable at dryer operating temperature, said composition comprising from about 50% to about 90% of a fatty alkyl sorbitan ester component and from about 10% to about 50% of a cationic antistatic/fabric softener component.

2. A method according to claim 1 wherein the softening composition is applied to the fabrics from a flexible substrate.

3. A method according to claim 2 wherein the sorbitan ester material is selected from the group consisting of sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate and mixtures thereof, and mixed coconut alkyl sorbitan mono- and di-esters and mixed tallowalkyl sorbitan mono- and di-esters and wherein the cationic anti-static/fabric softener component is selected from the group consisting of dialkyldimethylammonium methylsulfate wherein the alkyl groups are selected from the group consisting fo tallowalkyl, stearyl, palmityl and behenyl.

4. A method according to claim 3 wherein the sorbitan ester material comprises a mixture of sorbitan monostearate and sorbitan monopalmitate.

5. A method according to claim 1 wherein the softening composition is applied to the dryer drum.

6. An article of manufacture adapted for providing fabric softening within an automatic clothes dryer, said article comprising:

(a) a fabric softening amount of softening composition having a melting point above about 38° C and being flowable at dryer operating temperatures, said composition comprising;
  i. from about 10% to about 50% by weight of the composition of a cationic fabric softener component, and
  ii. from about 50% to about 90% by weight of the composition of a fatty alkyl sorbitan ester component selected from the group consisting of $C_{10}$ to $C_{26}$ fatty esters of sorbitan and ethoxylates of said esters wherein one or more of the unesterified -OH groups in said esters contain from 1 to about 6 oxyethylene moieties; and (b) dispensing means which provides for release of said softening composition within an automatic laundry dryer at dryer operating temperatures, wherein when said dispensing means is a flexible substrate in sheet configuration the fabric softener composition is releasably affixed on said substrate to provide a weight ratio of softener composition to dry substrate ranging from about 10:1 to about 0.5:1.

7. An article according to claim 6 wherein the sorbitan ester component comprises a member selected from the group consisting of the $C_{10}$-$C_{26}$ alkyl sorbitan esters, and mixtures thereof and wherein the cationic component is a quaternary ammonium fabric softener.

8. An article according to claim 7 wherein the quaternary ammonium softener is present at a level of from about 10% to about 35% of the composition and the sorbitan ester is present at a level of from about 65% to about 90% of the composition.

9. An article according to claim 7 wherein the quaternary ammonium softener is present at a level of from about 20% to about 50% of the composition and the sorbitan ester is present at a level of from about 50% to about 80% of the composition.

10. An article according to claim 7 wherein the sorbitan ester component comprises a member selected from the group consisting of $C_{10}$-$C_{26}$ alkyl sorbitan monoesters and $C_{10}$-$C_{26}$ alkyl sorbitan di-esters, and mixtures thereof and wherein the quaternary ammonium fabric softener is in the methylsulfate form.

11. An article according to claim 10 wherein the sorbitan ester component comprises a member selected from the group consisting of sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate and mixtures thereof, and mixed coconutalkyl sorbitan mono- and di-esters and mixed tallowalkyl sorbitan mono- and di-esters.

12. An article according to claim 10 wherein the dispensing means comprises a flexible substrate in a sheet configuration having the softening composition releasably affixed thereto and wherein the cationic anti-static softening agent is selected from the group consisting of dialkyldimethylammonium methylsulfates wherein the alkyl groups are selected from the group consisting of tallowalkyl, stearyl, palmityl and behenyl.

13. An article according to claim 12 wherein the quaternary ammonium softener is present at a level of from about 10% to about 35% of the composition and the sorbitan ester is present at a level of from about 65% to about 90% of the composition.

14. An article according to claim 12 wherein the quaternary ammonium softener is present at a level of from about 20% to about 50% of the composition and the sorbitan ester is present at a level of from about 50% to about 80% of the composition.

15. An article according to claim 12 wherein the substrate has an absorbent capacity of from about 4 to about 12 and the softening composition is impregnated into the substrate.

16. An article according to claim 15 wherein the substrate comprises a non-woven cloth having an absorbent capacity of from about 5 to 7 and wherein the weight ratio of softening composition to substrate on a dry weight basis ranges from about 5:1 to 1:1.

17. An article according to claim 16 wherein the non-woven cloth substrate comprises cellulosic fibers, said fibers having a length of from 3/16 inch to 2 inches and a denier of from 1.5 to 5 and wherein said substrate is adhesively bonded together with a binder resin.

18. An article according to claim 15 wherein the sorbitan ester component comprises a member selected from the group consisting of sorbitan monolaurate, sorbitan monomyristate, sorbitan monopalmitate, sorbitan monostearate, sorbitan monobehenate, sorbitan dilaurate, sorbitan dimyristate, sorbitan dipalmitate, sorbitan distearate, sorbitan dibehenate, and mixtures thereof, and mixed coconutalkyl sorbitan mono- and di-esters and mixed tallowalkyl sorbitan mono- and di-esters.

19. An article according to claim 18 wherein the sorbitan ester component comprises a mixture of sorbitan monostearate and sorbitan monopalmitate.

20. An article according to claim 15 wherein the flexible substrate has openings sufficient in size and number to reduce restriction by said article of the flow of air through an automatic laundry dryer.

21. An article according to claim 20 wherein the openings comprise a plurality of rectilinear slits extended along one dimension of the substrate.

22. An article according to claim 21 wherein the width of the individual slits is from about 0.2 inches to about 0.4 inches, said slits comprising from about 0.5% to about 75% of the area of the article.

23. An article according to claim 21 wherein the softening composition is impregnated in the substrate at a weight ratio of softening composition to substrate on a dry weight basis in the range of from 5:1 to 1:1 and wherein the sorbitan ester component of the softening composition comprises a mixture of sorbitan monostearate and sorbitan monopalmitate.

24. An article according to claim 23 wherein the cationic anti-static/softening agent is selected from the group consisting of dialkyldimethylammonium methylsulfate wherein the alkyl groups are selected from the group consisting of tallowalkyl, stearyl, palmityl and behenyl.

25. An article according to claim 24 wherein the cationic anti-static/softening agent is ditallowalkyldimethylammonium methylsulfate.

26. An article according to claim 6 wherein the dispensing means is an aerosol spray device.

* * * * *